(12) United States Patent
Venkatesan et al.

(10) Patent No.: US 9,515,809 B2
(45) Date of Patent: Dec. 6, 2016

(54) TESTING USING ANALOG NEAR END LOOP BACK CIRCUIT

(71) Applicant: Intel Corporation, Santa Clara, CA (US)

(72) Inventors: Sriram Venkatesan, Folsom, CA (US); Shridhar G. Bendi, Bangalore (IN)

(73) Assignee: Intel Corporation, Santa Clara, CA (US)

( * ) Notice: Subject to any disclaimer, the term of this patent is extended or adjusted under 35 U.S.C. 154(b) by 88 days.

(21) Appl. No.: 13/706,644

(22) Filed: Dec. 6, 2012

(65) Prior Publication Data

US 2014/0160944 A1 Jun. 12, 2014

(51) Int. Cl.
| | |
|---|---|
| *H04B 17/00* | (2015.01) |
| *H04L 5/14* | (2006.01) |
| *H04B 17/10* | (2015.01) |
| *H04B 17/20* | (2015.01) |
| *H04L 1/24* | (2006.01) |
| *H04B 3/46* | (2015.01) |
| *H04L 1/00* | (2006.01) |

(52) U.S. Cl.
CPC . *H04L 5/14* (2013.01); *H04B 3/46* (2013.01); *H04B 17/10* (2015.01); *H04B 17/20* (2015.01); *H04L 1/24* (2013.01); *H04L 2001/0094* (2013.01)

(58) Field of Classification Search
CPC ...... G01R 31/28; G01R 31/04; G01R 31/26; G01R 31/20; G01R 31/3177; H03M 1/10; G11C 29/04; H04J 3/14; H01L 21/265; H03K 19/0175; H04B 1/04; H04B 3/23; H04B 3/234; H03L 7/00; G06F 19/00; H04L 12/2801

USPC ............ 714/716, 718, 728; 324/538, 750.02, 324/754.03; 341/120; 370/249; 257/547; 326/82; 455/103; 331/16; 702/119

See application file for complete search history.

(56) References Cited

U.S. PATENT DOCUMENTS

| | | | | |
|---|---|---|---|---|
| 7,200,170 | B1* | 4/2007 | Desandoli et al. | 375/224 |
| 7,564,314 | B2* | 7/2009 | Familia | 331/16 |
| 7,590,392 | B2* | 9/2009 | Navaratnam et al. | 455/103 |
| 7,650,540 | B2* | 1/2010 | Chang et al. | 714/716 |
| 8,543,876 | B1* | 9/2013 | Wright | 714/728 |
| 2006/0103407 | A1* | 5/2006 | Kakizawa et al. | 324/763 |
| 2007/0104111 | A1* | 5/2007 | Kakizawa | 370/249 |
| 2012/0191400 | A1* | 7/2012 | Sontakke et al. | 702/119 |
| 2012/0223736 | A1* | 9/2012 | Wu | H04L 25/0278 326/30 |
| 2014/0001601 | A1* | 1/2014 | Scatchard et al. | 257/547 |
| 2015/0048855 | A1* | 2/2015 | Wen | G01R 31/318513 324/750.01 |

OTHER PUBLICATIONS

Nejedlo, et al., "Intel® IBIST, the Full Vision Realized", International Test Conference, 2009, 1-11 pages.

(Continued)

*Primary Examiner* — Charles C Jiang
*Assistant Examiner* — Wali Butt
(74) *Attorney, Agent, or Firm* — Patent Capital Group

(57) ABSTRACT

Particular embodiments described herein can offer an electronic device that includes a transmit circuit to form part of a transmit interface, and a receive circuit to form part of a receive interface. The transmit circuit and the receive circuit are to test at least one functional aspect of the electronic device on which the transmit circuit and the receive circuit reside. The transmit circuit and the receive circuit are coupled together by an analog near end loop back connection established through a resistor segment.

29 Claims, 4 Drawing Sheets

(56) References Cited

OTHER PUBLICATIONS

Nejedlo, Jay J., "IBIST™(Interconnect Built-in-Self-Test) Architecture and Methodology for PCI Express", Intel's Next Generation Test and Validation Methodology for Performance IO, 2003, vol. 2, pp. 114-122.

Datta, "High Speed I/O testing: trends and challenges", Nov. 12, 2005, 35 pages.

* cited by examiner

TESTING USING ANALOG NEAR END LOOP BACK CIRCUIT

TECHNICAL FIELD

Embodiments described herein generally relate to high-speed serial input output (IO) testing using analog near end loop back circuits.

BACKGROUND

In recent times, the testing input/output (I/O) circuitry on front-side bus (FSB) based microprocessor products was possible using conventional testers. This is because the FSB speed was comparable to the actual tester speeds. For example, in the context of testing an analog interface, a manufacturer could simply buy different testers having a desired frequency. However, as the speed of FSB I/O ports increased dramatically, new protocols needed to be developed to accommodate these scenarios. The alternating current I/O loop back (ACIOLB) test technique was used to test the I/O circuitry with on-die interconnect built-in self-test (IBIST) circuitry. With the advent of 3G I/O circuitry, the challenge of testing I/O circuitry further increased. 3G I/O circuits operate at speeds of 2.5 Gbs and the voltage swings can be in the order of millivolts (i.e., a fraction of the I/O power supply voltage). Testing 3G I/O circuitry using slow testers was possible by implementing I/O Design For Test (DFT) features (e.g., on-die loop back IBIST logic). Moreover, it has become impossible to keep up with the rapidly changing I/O frequencies. In essence, it has become futile to continue chasing high-end frequency testers in hopes of offering suitable testing solutions for various electronic products.

BRIEF DESCRIPTION OF THE DRAWINGS

Embodiments are illustrated by way of example and not by way of limitation in the FIGURES of the accompanying drawings, in which like references indicate similar elements and in which.

Figure 1:
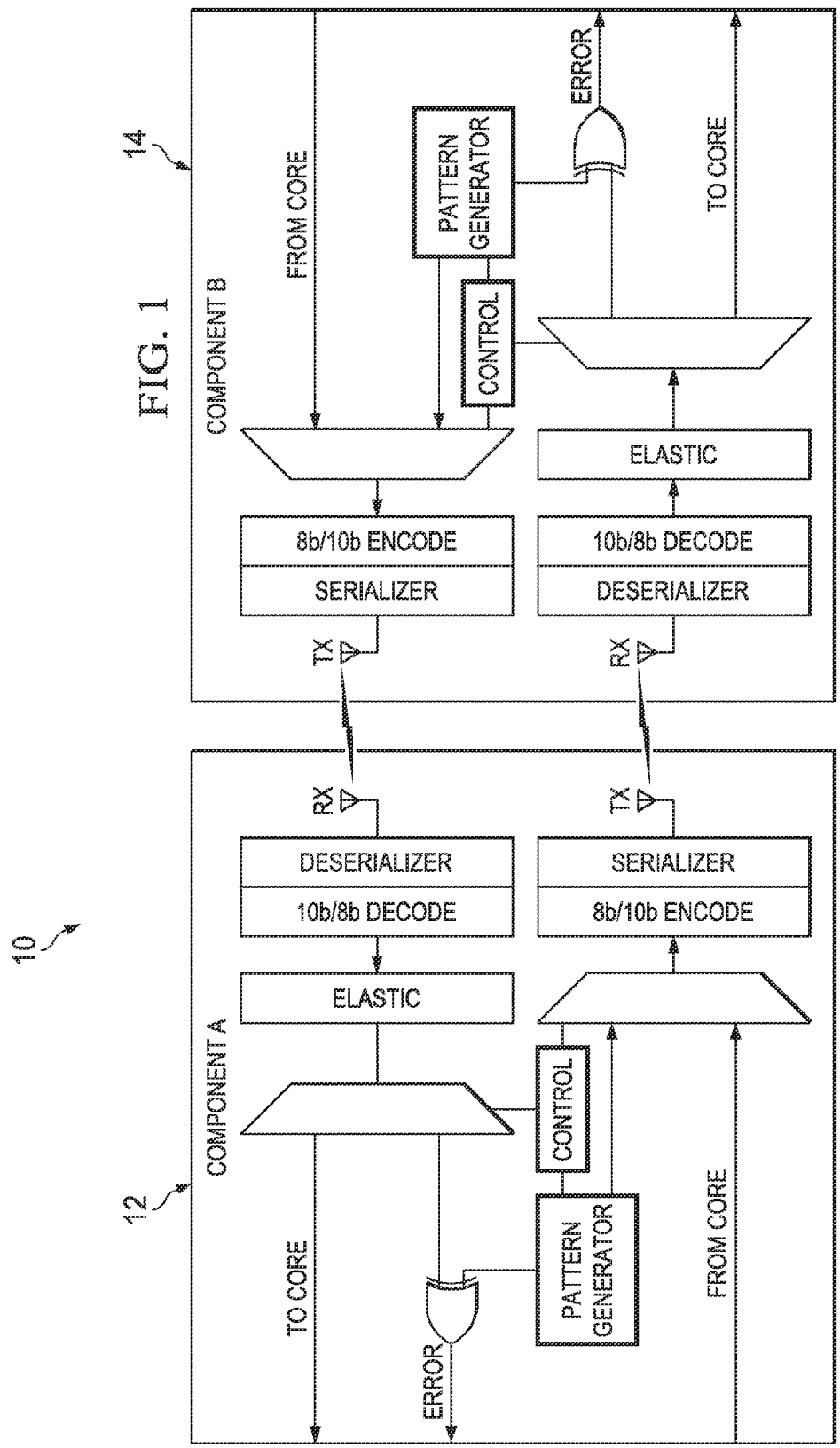
FIG. 1 is a simplified circuit diagram illustrating an example embodiment of an interconnect built-in self-test (IBIST) architecture for a differential bus associated with the present disclosure.

The FIGURES of the drawings are not necessarily drawn to scale or proportion, as their dimensions, arrangements, and specifications can be varied considerably without departing from the scope of the present disclosure.

DETAILED DESCRIPTION OF EXAMPLE EMBODIMENTS

The following detailed description sets forth example embodiments of apparatuses, methods, and systems relating to testing using analog near end loop back circuits. Features such as structure(s), function(s), and/or characteristic(s), for example, are described with reference to one embodiment as a matter of convenience; various embodiments may be implemented with any suitable one or more of the described features.

As the speeds of input/output (I/O) circuitry have increased, the corresponding I/O circuitry has also grown in complexity. As a result, it is important to test the I/O circuitry thoroughly early in the high-volume manufacturing (HVM) test flow. Despite the increase in speed and complexity of I/O designs, the testers that are used in the HVM test flow are still structural ones (e.g., that can operate in the order of approximately 200 MHz). Link-based microprocessor products have I/O circuits that operate at speeds close to 6.4 Gbs (significantly higher than 3G I/O) and the voltage swings are in the order of 550 mV to 650 mV. As a result, the typical design for test (DFT) features that were implemented for 3G I/O circuitry cannot be used for a Common System Interface (CSI) and Fully Buffered Dual in-line Memory Module (DIMM) (FBD) I/O because the conventional DFT features are intrusive in nature and, further, routinely affect the functionality of the CSI/FBD in a native/functional mode.

Particular embodiments described herein provide a new circuitry and an enhanced test technique that could be used to test various high-speed circuitries in link-based microprocessors. One test technique of the present disclosure can help to test a high-speed input/output circuit during sort testing. The sort testing is part of a HVM test flow, where the test is conducted at wafer level in a pin constrained environment. In more particular embodiments, the present disclosure can provide a new circuit and DFT technique that allows the CSI/FBD I/O to establish a link from the transmitter (TX) and the receiver (RX) of the same port without impacting the electrical characteristics of the pad circuitry in the native/functional mode. Such a technique can allow an individual to test various circuit components in both the transmitter and the receiver block segments. Additionally, such an approach can suitably test the digital logic that resides in the CSI/FBD I/O circuitry. Moreover, because FBD I/O could be configured as the CSI, the proposed test technique could be used for testing both the CSI and the FBD I/O circuitry. Embodiments of circuits discussed herein can offer a viable testing technique for evaluating the CSI and FBD I/O during a sort test.

One testing objective is to provide on-die testing without having to invest more money on high-speed testers, while not adversely effecting native/functional mode of operation. High-speed serial IO (HSIO) can comprise transmit (TX) and receive (RX) lanes to form fully duplex interfaces. Due to certain floor plan constraints or other design restrictions, chip design teams end up with different TX/RX circuit configurations. In some cases, TX and RX buffers corresponding to a lane are placed next to each other and, in other cases, they could be diametrically far apart from each other. When TX and RX buffers are placed far apart from each other, traditional Analog Near End (ANE) loop back connections from TX to RX (used for testing reasons) may adversely affect the I/O functionality when operating in a normal functional mode. The proposed loop back implementation scheme in this disclosure can overcome these issues (as well as others) by reusing a resistor segment (e.g., the unused R-term leg) to establish the loop back. Because of this loop back implementation scheme, there is no undesired effect on the TX pad capacitance and, hence, to the functionality of the HSIO under normal functional mode. Additionally, the proposed solution can work both for interleaved and non-interleaved TX/RX design styles, while not impacting the resistance compensation code.

In certain instances, embodiments of the present disclosure can use the existing components to implement a loop back from the transmitter to the receiver without impacting the performance in the functional mode. Moreover, such concepts can be further extended to the Serial Interfaces with various transmitters and receivers (e.g., Peripheral Component Interconnect Express (PCIe)/Serial Advanced Technology Attachment (SATA)/Direct Media Interface (DMI), etc.).

Particular embodiments described herein can offer an electronic device (e.g., a transistor, a processor, a microprocessor, an amplifier, a field-programmable gate array (FPGA), any other type of integrated circuit, etc.) that includes a transmit circuit to form part of a transmit interface, and a receive circuit to form part of a receive interface. [Note that the electronic device can be part of any type of notebook computer, laptop computer, personal computer, mobile device, tablet computer/device (e.g., an i-Pad), a personal digital assistant (PDA), a smartphone, etc.] The transmit circuit and the receive circuit are to test at least one functional aspect of the electronic device on which the transmit circuit and the receive circuit reside. The transmit circuit and the receive circuit are coupled together by an analog near end loop back connection established through a resistor segment.

In more specific embodiments, the resistor segment can be a poly resistor coupled to a pad of the electronic device. A circuit pathway associated with the poly resistor is to be controlled by a design for test (DFT) test signal. Enablement of the test signal establishes a connection between the transmit circuit and the receive circuit. The resistor segment includes a plurality of termination resistors set by a compensation circuit. The analog near end loop back connection is implemented using separate controllable resistors to be provided as part of the resistor segment. A pad capacitance associated with the transmit circuit is to remain constant during a test involving the electronic device. The transmit interface and the receive interface can form fully duplexed interfaces.

Numerous details associated with these capabilities, along with various other features and functions associated with the present disclosure are discussed below with reference to the accompanying FIGURES and descriptions.

High-Speed Testing Configuration

FIG. 1 is a simplified circuit diagram 10 illustrating an example embodiment of an Interconnect Built In Self Test (IBIST) architecture for a differential bus associated with the present disclosure. This particular configuration includes a component 'A' 12, and a component 'B' 14. As a general proposition, the IBIST methodology integrates a custom BIST architecture into processors and chipsets dedicated for platform level interconnect testing. It can address the known fault spectrum for performance I/O. It represents an on-die feature that enables chip-to-chip interconnect testing: addressing both the static and high frequency fault spectrums associated with high performance bus topologies. It is designed for use in component and system validation, as well as factory testing scenarios.

In typical configurations, the IBIST logic resides in processor and chipset components. The IBIST signal and timing path is similar to normal operations, and it runs at full bus-speed. There is also an automatic diagnosis to pin and pattern level, along with an integrated pattern generation. The test execution is configurable on a per I/O basis. Because IBIST operates independently of normal silicon operations and bus protocols, it enables testing to be deterministic. The on-board system IBIST control facilitates the test configuration, sequencing, and result analysis of integrated IBIST component capabilities.

IBIST functions can be executed through protocols programmed into the BIST controller. Test configuration, execution, and module level diagnosis can be carried out (seamlessly) by each protocol with the BIST controller. Each component featuring the IBIST technology can be configured as either a transmitting or a receiving agent. Once the IBIST capable components have been configured, testing may begin. The transmitting agent on the bus can initiate the bus cycles to send the pattern to the receiver. Test synchronization between components using the IBIST pattern generator can be accomplished similar to that utilized by the bus in the normal operation.

The receiver retransmits pattern information sent by the transmitting agent. The transmitting agent performs error checking on the pattern. Error checking is performed on a symbol-to-symbol basis. Symbols can be defined by an encoding protocol defined in the PCIe standard. The error signal in the local control can be used to record the point in the pattern transfer in which the first error occurred. The error signals from each local control are also connected to the error bits in a global control register, which enables monitoring of any possible error conditions after and/or during a test.

Figure 2:
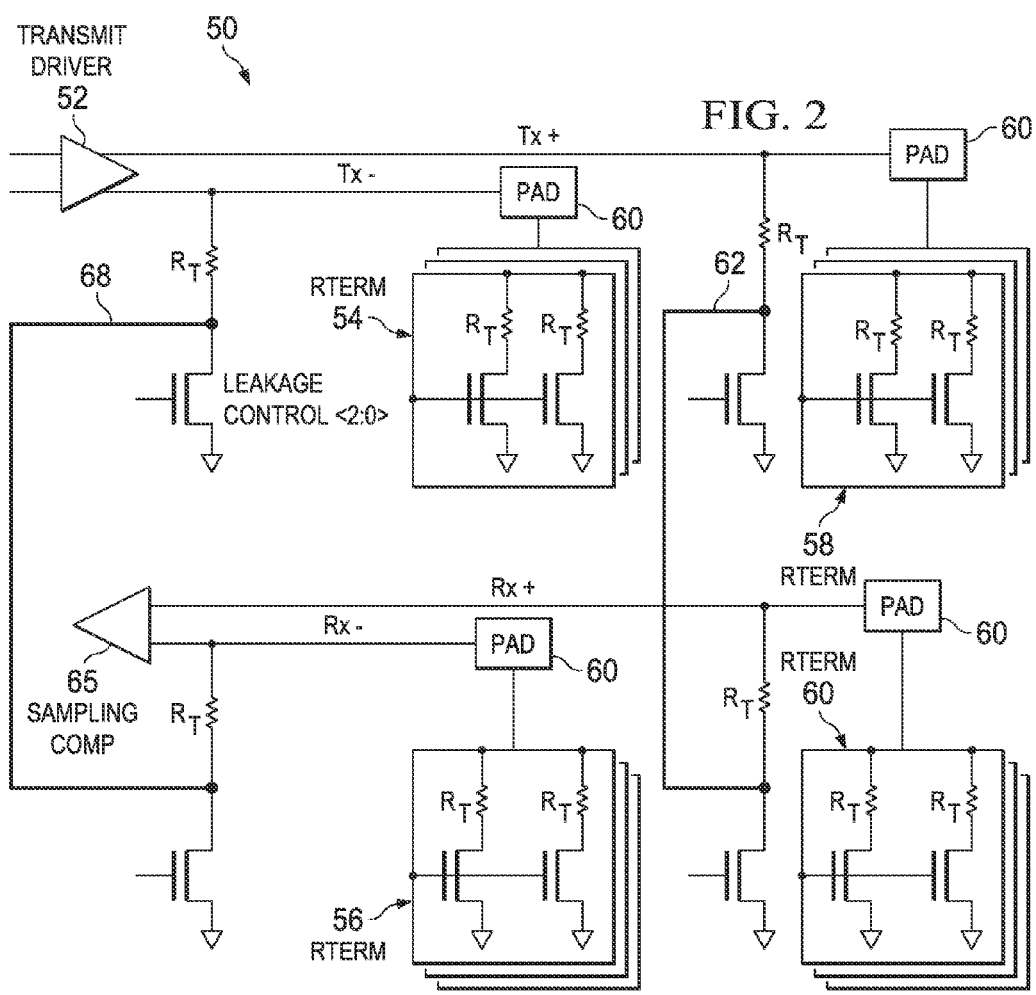
FIG. 2 is a simplified circuit diagram illustrating one possible implementation associated with the present disclosure.

FIG. 2 is a simplified circuit diagram 50 illustrating one possible implementation associated with the present disclosure. Circuit diagram 50 includes a transmit driver 52, a sampling comp instance 65, and a plurality of pad connections 60. The proposed circuit and design for test (DFT) test technique can use existing on-die termination resistors that are present on both the transmitter and the receiver circuits. Further, the implementation can use a special leg to establish the physical connection between the TX and the RX circuitry. In operation, such a technique can effectively test both digital and analog circuitry of I/O designs. A particular embodiment of the present disclosure involves an Analog Near End (ANE) loop back implementation for the CSI/FBD I/O circuit.

Before turning to additional details associated with circuit diagram 50, it is important to offer some foundational information associated with testing more generally. Wafer testing is a step performed during HVM testing. During this testing step, individual integrated circuits that are present on the wafer die are tested for manufacturing defects by applying special test patterns to them. The process of wafer testing can be referred to in several ways, where Wafer Sort (WS), Wafer Final Test (WFT), Electronic Die Sort (EDS), and Circuit Probe (CP) are probably the most common.

A front-side bus (FSB) is a computer communication interface (bus) used in chip-based computers. Data is carried between the central processing unit (CPU) and a memory controller hub (sometimes referred to as the Northbridge). Depending on the implementation, some computers may also have a backside bus that connects the CPU to a cache. The bus and the cache connected to it are faster than accessing the system memory (or RAM) via the front-side bus. The speed of the front-side bus is often used as an important measure of the performance of a computer. In general, front-side refers to the external interface from the processor to the rest of the computer system, as opposed to the backside, where the backside bus connects the cache (and potentially other CPUs).

A FSB is generally used on PC-related motherboards (including personal computers and servers), seldom with the data and address buses used. Front-side buses usually connect the CPU and the rest of the hardware via a chipset, which is implemented as a Northbridge and a Southbridge. Other buses (like the Peripheral Component Interconnect (PCI), Accelerated Graphics Port (AGP), and memory buses) connect to the chipset such that data can flow between the connected devices. These secondary system buses usually run at speeds derived from the front-side bus clock, but are not necessarily synchronized to it. The frequency at which a processor operates is determined by applying a clock multiplier to the front-side bus (FSB) speed. By varying either the FSB or the multiplier, different CPU speeds can be achieved.

For high volume CPUs (and with the leading process technologies), it is not practical to screen out parts based on the functional content and, subsequently, enable this in the HVM flow. This adds to the cost of the product, as packaging should be done before full speed functional I/O testing can be enabled. In regards to a typical analog near end loop back, an active switch is provided on the pad node, which adds to the pad capacitance. This switch establishes the connection from the transmitter to the receiver. This impacts the capacitance of the pad node and, further, it is seen in the functional/native mode. Moreover, such a configuration cannot be used in certain architectures, particularly so when high frequencies (e.g., 6.4 GT/s and higher) are targeted. Additionally, common strategies in this area limit the amount of interleaving that can be done from the transmitter to the receiver of the same lane, as the size of the device would need to increase to account for the drop across the switch device (and also the routing from the TX to the RX). A huge device is needed, where degradations in performance for these high-speed interfaces cannot be tolerated.

Referring back to circuit diagram 50, a number of aspects should be taken into account as part of the implementation of the ANE loop back. For example, there are a number of restrictions that prevent a tester from using a conventional loop back approach for testing high-speed CSI/FBD I/O. One such restriction is pad capacitance, as CSI and FBD I/O can operate at 6.4 GT/s and higher. There is a strict pad capacitance specification to meet these speeds and, therefore, attention should be paid when implementing the loop back scheme (to connect the transmitter and the receiver circuitry) to ensure pad capacitance is not worsened. Increases in the pad capacitance would make the I/O circuit inoperable in a native/functional mode.

For the termination resistance value (associated with a plurality of R-terms 54, 56, 58, 60 shown in FIG. 2), the CSI/FBD I/Os can be terminated with a 50 Ohm termination resistance (to ground). This termination resistance can compensate for process, voltage, and temperature corner conditions. Accordingly, attention should be paid to ensure the termination resistance value is intact. Deviations in the termination resistor value can result in a signal integrity issue.

In terms of the operating frequency, the sort testing can be performed at a lower frequency (lower than the maximum operating frequency). Typical sort frequency could range between one-half to one-third a maximum operating frequency of the I/O circuit. In regards to the area impact, the area of I/O designs is increasing and, thus, the implementation of the ANE circuit should have minimum area overhead.

In operation of an example embodiment, circuit diagram 50 provides for an effective ANE loop back between the TX and RX ports. The CSI/FBD I/O can have termination resistors to a voltage source source (Vss), where the termination resistors are set to 50 Ohms by a compensation circuit so that the value remains the same across all the process, voltage, and temperature variations. The ANE loop back can be implemented using separate controllable legs 62, 68, which are detailed below with reference to FIG. 3.

The analog near end loop back leg has a poly resistor connected to the pad and the pathway can be controlled by the DFT test signal that goes to the transistor (e.g., a processor of any kind). When this test signal is enabled, the physical connection is established between the TX and the RX. In a particular non-limiting embodiment, the poly resistor connected to the pad has an approximate resistance value of 15 Ohm (e.g., in the context of a 65 nm process technology). The combination of the poly resistor (Rt) and the transistor (controlled by the test signal) does not worsen the pad capacitance. Because of high-speed requirements, I/O circuits can be implemented in an interleaved fashion. Further, the interleaved design increases the physical separation between the TX and RX ports. As a result, connecting a simple metal line between the TX and RX ports would adversely affect pad capacitance. The pathway taken from the TX pad to the RX pad is shown in FIG. 3.

Figure 3:
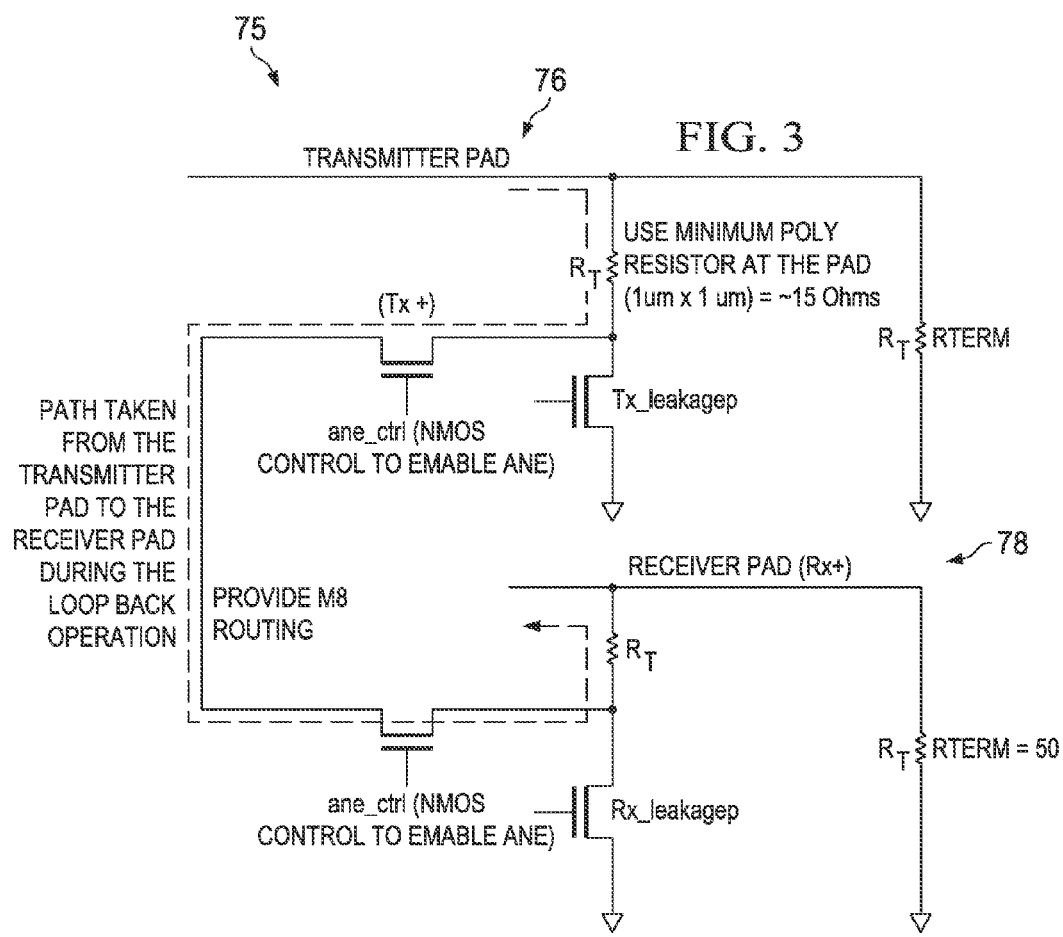
FIG. 3 is a simplified circuit diagram illustrating one possible path from a transmitter to a receiver during an analog near end loop back in accordance with one example implementation associated with present disclosure.

FIG. 3 is a simplified circuit diagram 75 illustrating one possible pathway from a transmitter to a receiver during an analog near end loop back in accordance with one example implementation associated with present disclosure. Circuit diagram 75 includes a transmitter pad 76 and a receiver pad 78. Circuit diagram 75 may include the following design specifications. First, the transmitter and receiver circuits are interleaved with about 8000 microns between the transmitter and its corresponding receiver. Additionally, the pad capacitance of 300 fF and 1 pF is applied as a load (e.g., 1 pF is the max pad capacitance after packaging, but 1 pF will not be seen during sort). The termination settings are the same when analog near end is enabled or disabled (e.g., ensured with the DFT hooks). The minimum frequency of operation of the analog circuit is approximately 800 MHz (e.g., lower than the sort frequency). The resultant shows that the differential input seen at the receiver is significantly larger than the spec receiver input differential voltage and should be detected by the RX.

The impact of the ANE circuit on the termination resistor value is important to the design. The resultant waveforms show that the ANE loop back implementation does not affect the termination value. Additionally, simulations associated with circuit diagram 75 confirmed the ability to implement the analog near end loop back feature to test the high-speed serial links in sort. Simulations were done and verified in the worst-case conditions to make sure it does not impact the electrical behavior and performance of the link.

Hence, the high-speed serial IO (HSIO) comprises transmit and receive lanes to form fully duplex interfaces. Due to floor plan issues (or other design restrictions), chip design teams end up with different TX/RX grouping configurations. In some cases, the TX and RX buffers corresponding to a lane are placed next to each other and, in other extreme cases, they could be diametrically far apart from each other. When TX and RX buffers are placed far apart from each other, a typical ANE loop back connection from the TX to the RX (used for testing reasons) may adversely affect the I/O functionality when operating in a normal functional mode. The proposed loop back implementation scheme helps to overcome this bottleneck through a resistor segment (e.g., by reusing the unused R-term leg) to establish the loop back. This loop back implementation scheme inhibits undesired effects to the TX pad capacitance and, hence, to the functionality of the HSIO under a normal functional mode.

Such a solution can work both for interleaved and non-interleaved TX/RX design styles, while not impacting resistance compensation code.

Figure 4:
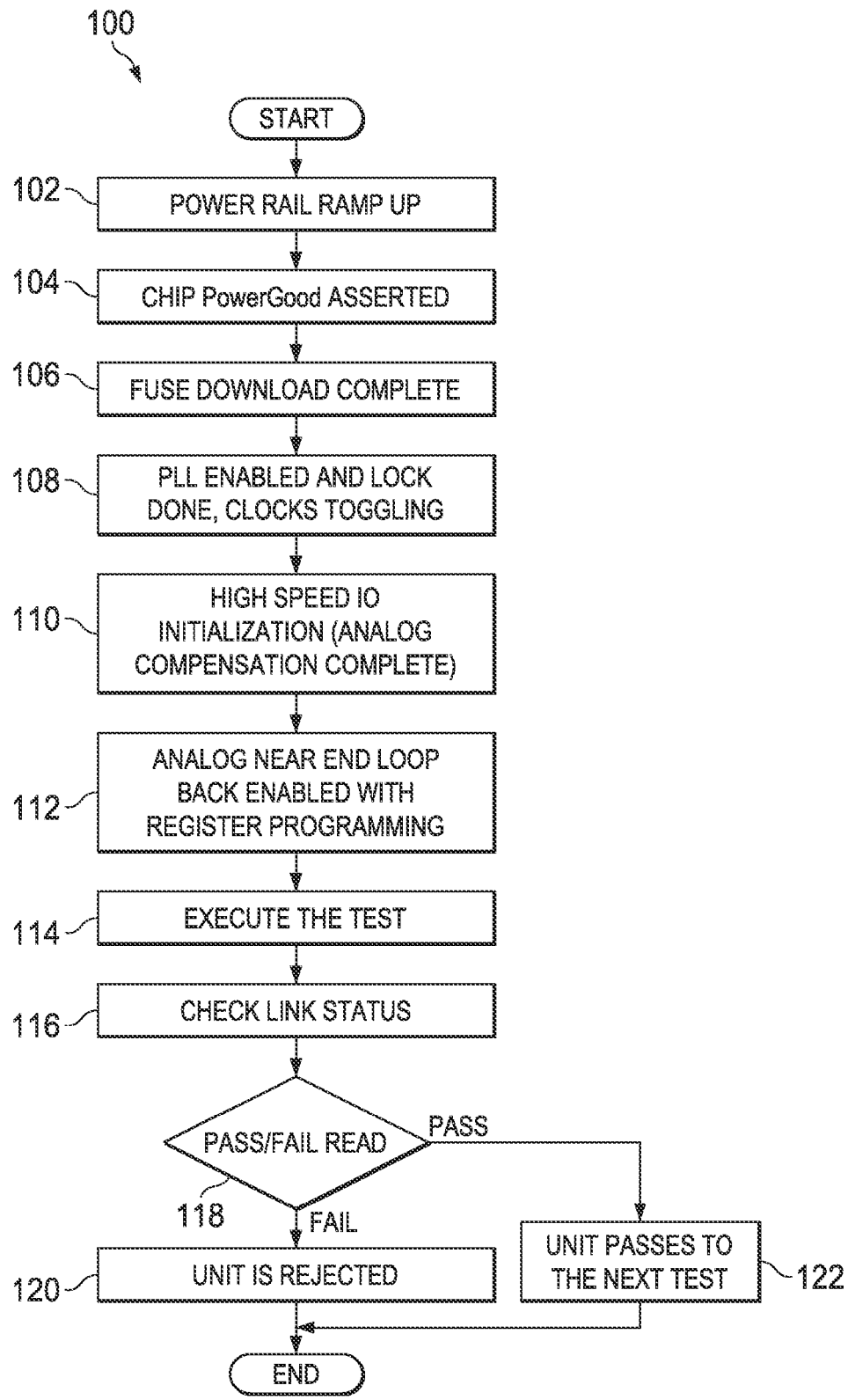
FIG. 4 is a simplified flowchart illustrating one possible set of activities associated with the present disclosure.

Turning to FIG. 4, FIG. 4 is a simplified flowchart 100 illustrating one possible set of activities associated with the present disclosure. This particular flow may begin at 102, where a power rail ramp up occurs. This may further include any type of power up protocol. At 104, the chip 'powergood' is asserted such that the chip power is functional. At 106, the fuse download is completed. At 108, the phase locked loop (PLL) is enabled and the clocks can begin toggling. At 110, the high-speed I/O initialization can occur (i.e., indicating that the analog compensation is complete). At 112, the analog near end loop back is established with register programming. The test is executed at 114, and the link status is checked at 116. These testing activities can involve any suitable protocol, technique, regimen, approach, set of rules, procedures, etc. If the unit passes at 118, then it would move to the next step in the testing process (shown generally at 122). If the unit fails its test at 118 (i.e., the die is defective in some way), then the unit would be rejected at 120 (and any number of ensuing steps may occur to address this failure).

Note that particular embodiments of the present disclosure may readily be provided as (or included in) a system on chip (SOC) central processing unit (CPU) package. An SOC represents an integrated circuit (IC) that integrates components of a computer or other electronic system into a single chip. It may contain digital, analog, mixed-signal, and often radio frequency functions: all of which may be provided on a single chip substrate.

For one embodiment, at least one processor may be packaged together with logic for one or more controllers of system control logic. In one embodiment, at least one processor may be packaged together with logic for one or more controllers of system control logic to form a System in Package (SiP). In one embodiment, at least one processor may be integrated on the same die with logic for one or more controllers of system control logic. For a particular embodiment, at least one processor may be integrated on the same die with logic for one or more controllers of system control logic to form a System on Chip (SoC).

Non-volatile memory and/or storage device(s) may be used to store data and/or instructions, for example within software. Non-volatile memory and/or storage device(s) may include any suitable non-volatile memory, such as flash memory for example, and/or may include any suitable non-volatile storage device(s), such as one or more hard disc drives (HDDs), one or more compact disc (CD) drives, and/or one or more digital versatile disc (DVD) drives for example.

The present disclosure may also be used in conjunction with any tablet, iPad, Notebook, laptop, or any other computing device, many of which can include touch input features. The touch input features may include a touch sensor and may be implemented using any suitable touch-sensitive technology such as, for example and without limitation, capacitive, resistive, surface acoustic wave (SAW), infrared, and optical imaging. The present disclosure may be implemented using any suitable multi-touch technology.

The system control logic, in a particular embodiment, may include any suitable interface controllers to provide for any suitable interface to at least one processor and/or to any suitable device or component in communication with system control logic. System control logic, in a particular embodiment, may include one or more memory controllers to provide an interface to system memory. System memory may be used to load and store data and/or instructions, for example, for the architecture of the present disclosure. System memory, in a particular embodiment, may include any suitable volatile memory, such as suitable dynamic random access memory (DRAM) for example. System control logic, in a particular embodiment, may include one or more input/output (I/O) controllers to provide an interface to a display device, touch controller, and non-volatile memory and/or storage device(s).

For touch control, touch controller may include touch sensor interface circuitry and touch control logic. Touch sensor interface circuitry may be coupled to detect touch input over a first touch surface layer and/or a second touch surface layer of display. Touch sensor interface circuitry may include any suitable circuitry that may depend, for example, at least in part on the touch-sensitive technology used for an associated touch input device. Touch sensor interface circuitry, in one embodiment, may support any suitable multi-touch technology. Touch sensor interface circuitry, in one embodiment, may include any suitable circuitry to convert analog signals corresponding to a first touch surface layer and a second surface layer into any suitable digital touch input data. Suitable digital touch input data for one embodiment may include, for example, touch location or coordinate data.

Touch control logic may be coupled to help control touch sensor interface circuitry in any suitable manner to detect touch input over a first touch surface layer and a second touch surface layer. Touch control logic for one embodiment may also be coupled to output in any suitable manner digital touch input data corresponding to touch input detected by touch sensor interface circuitry. Touch control logic may be implemented using any suitable logic, including any suitable hardware, firmware, and/or software logic (e.g., non-transitory tangible media), that may depend, for example, at least in part on the circuitry used for touch sensor interface circuitry. Touch control logic for one embodiment may support any suitable multi-touch technology.

Touch control logic may be coupled to output digital touch input data to system control logic and/or at least one processor for processing. At least one processor for one embodiment may execute any suitable software to process digital touch input data output from touch control logic. Suitable software may include, for example, any suitable driver software and/or any suitable application software. For example a touch enabled interface can be provided to receive user feedback (touch input of any kind from a user, a stylus, etc.) in order to perform one or more operations (e.g., any activity associated with a function of the associated device).

It should also be noted that the present disclosure can operate in conjunction with Quick Path Interconnect (QPI), as well as with any high-speed, differential link with a transmitter and a receiver. Such examples could include PCIe, Mobile Industry Processor Interface (MIPI), and various other platforms, technologies, and protocols.

Note that in certain example implementations, the functions outlined herein may be implemented in conjunction with logic that is encoded in one or more tangible, non-transitory media (e.g., embedded logic provided in an application-specific integrated circuit (ASIC), in digital signal processor (DSP) instructions, software [potentially inclusive of object code and source code] to be executed by a processor, or other similar machine, etc.). In some of these instances, memory elements can store data used for the operations described herein. This includes the memory elements being able to store software, logic, code, or processor instructions that are executed to carry out the activities described herein. A processor can execute any type of instructions associated with the data to achieve the operations detailed herein. In one example, the processors could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array (FPGA), a digital signal processor (DSP), an erasable programmable read only memory (EPROM), electrically erasable programmable read-only memory (EEPROM)) or an ASIC that includes digital logic, software, code, electronic instructions, or any suitable combination thereof.

Note that with the examples provided above, as well as numerous other examples provided herein, interaction may be described in terms of paired RX and TX instances. However, this has been done for purposes of clarity and example only. In certain cases, it may be easier to describe one or more of the functionalities of a given set of flows by only referencing a limited number of components. It should be appreciated that the architectures discussed herein (and its teachings) are readily scalable and can accommodate a large number of components, as well as more complicated/sophisticated arrangements and configurations. Accordingly, the examples provided should not limit the scope or inhibit the broad teachings of the present disclosure, as potentially applied to a myriad of other architectures.

It is also important to note that the steps in the flows illustrate only some of the possible signaling scenarios and patterns that may be executed by, or within, the circuits discussed herein. Some of these steps may be deleted or removed where appropriate, or these steps may be modified or changed considerably without departing from the scope of teachings provided herein. In addition, a number of these operations have been described as being executed concurrently with, or in parallel to, one or more additional operations. However, the timing of these operations may be altered considerably. The preceding operational flows have been offered for purposes of example and discussion. Substantial flexibility is provided by the present disclosure in that any suitable arrangements, chronologies, configurations, and timing mechanisms may be provided without departing from the teachings provided herein.

It is also imperative to note that all of the specifications, dimensions, and relationships outlined herein (e.g., resistance values, frequency values, materials, etc.) have only been offered for purposes of example and teaching only. Each of these data may be varied considerably without departing from the spirit of the present disclosure, or the scope of the appended claims. The specifications apply only to one non-limiting example and, accordingly, they should be construed as such. In the foregoing description, example embodiments have been described. Various modifications and changes may be made to such embodiments without departing from the scope of the appended claims. The description and drawings are, accordingly, to be regarded in an illustrative rather than a restrictive sense.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

Example Embodiment Implementations

One particular example implementation may include a system for performing one or more tests for an electronic device, the system including means for providing a transmit circuit to form part of a transmit interface; means for providing a receive circuit to form part of a receive interface; and means for initiating an operation to test at least one functional aspect of the electronic device on which the transmit circuit and the receive circuit reside. The transmit circuit and the receive circuit are coupled together by an analog near end loop back connection established through a resistor segment.

What is claimed is:

1. An electronic device, comprising:
   a transmit circuit to form part of a transmit interface;
   a pad corresponding to the transmit circuit and that outputs a first signal;
   a receive circuit to form part of a receive interface, wherein the transmit circuit and the receive circuit test at least one functional aspect of the electronic device on which the transmit circuit and the receive circuit reside; and
   an analog near end loop back connection that couples the transmit circuit to the receive circuit,
   the analog near end loop back connection including
   a resistor segment that receives the first signal and outputs a second signal, wherein the resistor segment is a poly resistor, and the analog near end loop back connection is implemented using separate controllable resistors provided as part of the resistor segment; and
   a transistor that receives the second signal and is coupled to the receive circuit.

2. The electronic device of claim 1, wherein a circuit pathway associated with the poly resistor is controlled by a design for test (DFT) test signal.

3. The electronic device of claim 2, wherein an enablement of the test signal establishes a connection between the transmit circuit and the receive circuit.

4. The electronic device of claim 1, wherein the resistor segment includes a plurality of termination resistors set by a compensation circuit.

5. The electronic device of claim 1, wherein a pad capacitance associated with the transmit circuit remains constant during a test involving the electronic device.

6. The electronic device of claim 1, wherein the transmit interface and the receive interface form fully duplexed interfaces.

7. The electronic device of claim 1, wherein the electronic device is a high-speed serial input output (HSIO) system.

8. The electronic device of claim 1, wherein the electronic device is part of an I/O circuit implemented in an interleaved fashion.

9. A method for performing one or more tests for an electronic device, the method comprising:

providing a transmit circuit to form part of a transmit interface, the transmit circuit corresponding to a pad that outputs a first signal; and providing a receive circuit to form part of a receive interface, wherein the transmit circuit is coupled by an analog near end loop back connection to the receive circuit, the analog near end loop back connection includes a resistor segment that receives the first signal and outputs a second signal, the resistor segment is a poly resistor, the analog near end loop back connection is implemented using separate controllable resistors provided as part of the resistor segment, and the analog near end loop back connection includes a transistor that receives the second signal and is coupled to the receive circuit.

10. The method of claim 9, further comprising:
providing a power up signal to the electronic device; and
enabling a phase locked loop (PLL) such that one or more clocks of the electronic device start toggling.

11. The method of claim 9, wherein the analog near end loop back connection is established with register programming.

12. The method of claim 9, further comprising:
executing a test to evaluate a link status of the electronic device; and
determining whether the electronic device failed the test.

13. The method of claim 9, wherein a circuit pathway associated with the poly resistor is controlled by a design for test (DFT) test signal.

14. The method of claim 13, wherein an enablement of the test signal establishes a connection between the transmit circuit and the receive circuit.

15. The method of claim 9, wherein the resistor segment includes a plurality of termination resistors set by a compensation circuit.

16. The method of claim 9, wherein the electronic device is part of an I/O circuit implemented in an interleaved fashion.

17. The method of claim 9, wherein a pad capacitance associated with the transmit circuit remains constant during a test involving the electronic device.

18. The method of claim 9, wherein the transmit interface and the receive interface form fully duplexed interfaces.

19. The method of claim 9, wherein the electronic device is a high-speed serial input output (HSIO) system.

20. A system, comprising:
a system on-chip (SOC) including a first circuit to form part of a transmit interface;
a pad corresponding to the first circuit and that outputs a first signal;
an integrated circuit coupled to the SOC including a second circuit to form part of a receive interface, wherein the first circuit and the second circuit test at least one functional aspect of the system on which the first circuit and the second circuit reside; and
an analog near end loop back connection that couples the first circuit to the second circuit,
the analog near end loop back connection including
a resistor segment that receives the first signal and outputs a second signal, wherein the resistor segment is a poly resistor, and the analog near end loop back connection is implemented using separate controllable resistors provided as part of the resistor segment; and
a transistor that receives the second signal and is coupled to the second circuit.

21. The system of claim 20, wherein a circuit pathway associated with the poly resistor is controlled by a design for test (DFT) test signal.

22. The system of claim 21, wherein an enablement of the test signal establishes a connection between the first circuit and the second circuit.

23. The system of claim 20, wherein the resistor segment includes a plurality of termination resistors set by a compensation circuit.

24. The system of claim 20, wherein a pad capacitance associated with the first circuit remains constant during a test involving the system.

25. The system of claim 20, wherein the transmit interface and the receive interface form fully duplexed interfaces.

26. The system of claim 20, wherein the system includes a touch enabled interface that receives an input to perform one or more operations.

27. The method of claim 9, further comprising:
initiating an operation to test at least one functional aspect of the electronic device on which the transmit circuit and the receive circuit reside.

28. The electronic device of claim 1, wherein the transmit circuit and the receive circuit are interleaved with about 8000 microns between the transmit circuit and the receive circuit.

29. The system of claim 20, wherein the first circuit and the second circuit are interleaved with about 8000 microns between the first circuit and the second circuit.

* * * * *